United States Patent [19]

Olliff, Jr.

[11] Patent Number: 4,911,795
[45] Date of Patent: Mar. 27, 1990

[54] METHOD OF PRESERVING A COMPOSITE MATERIAL CASED SOLID PROPELLANT ROCKET MOTOR

[75] Inventor: Martin T. Olliff, Jr., Huntsville, Ala.

[73] Assignee: Morton Thiokol, Inc., Chicago, Ill.

[21] Appl. No.: 85,577

[22] Filed: Aug. 14, 1987

[51] Int. Cl.⁴ .............................................. C25D 1/20
[52] U.S. Cl. ........................................ 204/4; 60/219;
60/253; 156/69; 156/150
[58] Field of Search ....................... 204/4; 156/69, 150,
156/151, 172, 245; 60/219, 253

[56] References Cited

U.S. PATENT DOCUMENTS

| 484,582 | 10/1892 | Edison | 264/106 |
| 2,680,699 | 4/1954 | Rubin | 154/121 |
| 4,357,395 | 11/1982 | Lifshin et al. | 428/607 |
| 4,394,400 | 7/1983 | Green et al. | 427/38 |
| 4,787,202 | 11/1988 | Crapiz | 60/253 |

OTHER PUBLICATIONS

F. A. Lowenheim, Electroplating, McGraw-Hill Book Co., New York, 1978, pp. 426–441.
J. J. Bessot, New Vacuum Deposition Techniques, Metal Finishing, Apr. 1980, pp. 63–66.

Primary Examiner—John F. Niebling
Assistant Examiner—William T. Leader
Attorney, Agent, or Firm—Gerald K. White

[57] ABSTRACT

A solid propellant rocket motor casing fabricated from strong filament in a matrix of curable polymer known in the trade as a composite motor casing is protected against permeation therethrough over long periods of time of water vapor from the atmosphere by a thin, lightweight, metal foil barrier comprising a metal foil adhesively backed tape such as aluminum foil tape spirally wrapped over the cylindrical or regular surface areas and by a separate, lightweight, metallic shell or dome having a thickness of 0.005 to 0.008 inches adhesively bonded onto the dome ends of the composite material cased solid propellant rocket motor, each metallic shell or dome being made by the use of a plastic or other destructible mold which is first coated with metal by an ion-vapor deposition process to a thickness of less than 0.005 inches, the thickness of the coating being subsequently increased by an electro-chemical coating process after which the mold is separated from the metal shell which then is adhesively bonded to the loaded rocket motor composite casing.

10 Claims, 2 Drawing Sheets

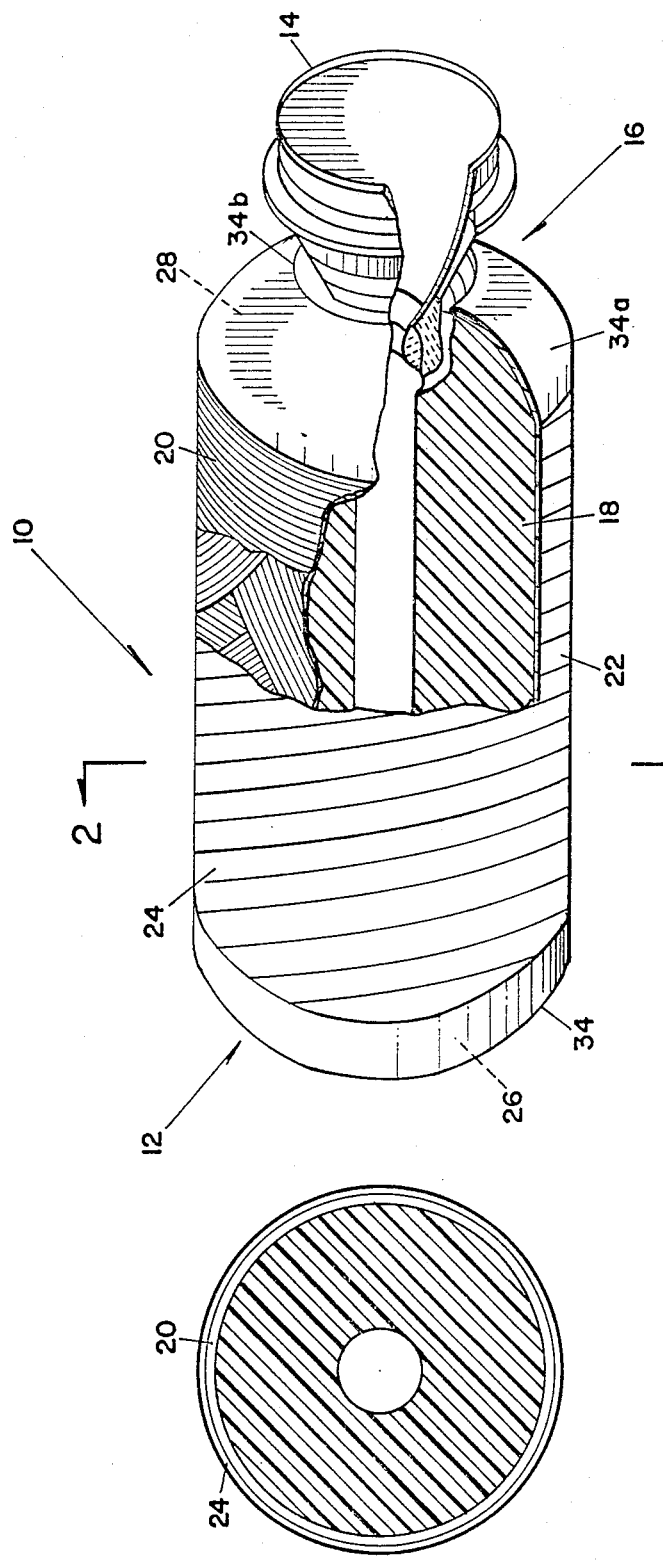

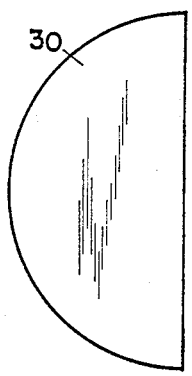
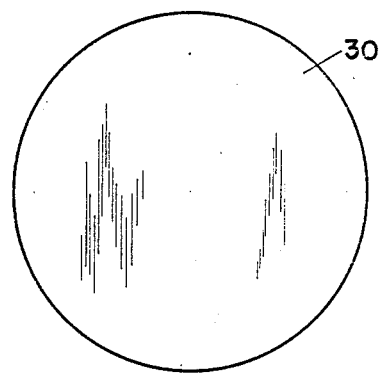
Fig. 3　　　　Fig. 4
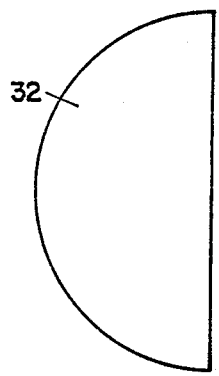
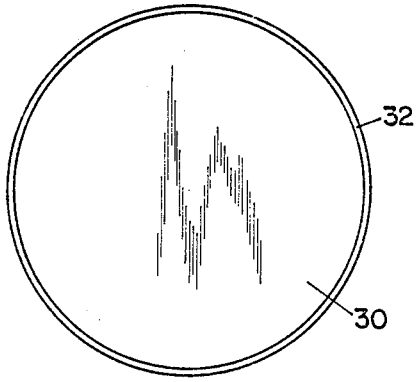
Fig. 5　　　　Fig. 6
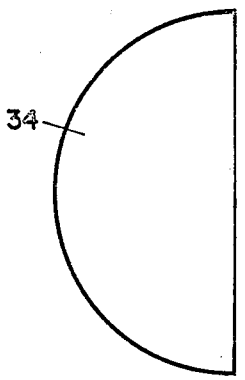
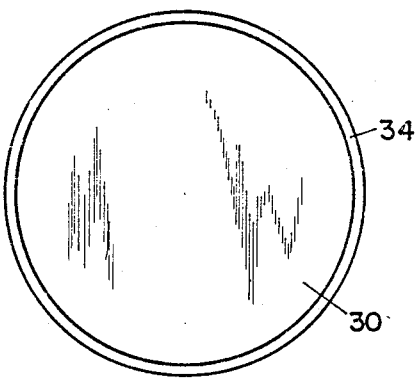
Fig. 7　　　　Fig. 8
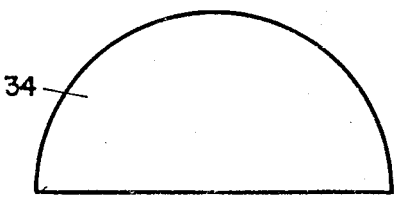
Fig. 9

METHOD OF PRESERVING A COMPOSITE MATERIAL CASED SOLID PROPELLANT ROCKET MOTOR

BACKGROUND OF THE INVENTION

1. Field of the Invention

This invention relates to an improvement in solid propellant rocket motors, and more particularly, to such motors that are encased in a composite or filament-wound material.

2. Description of the Prior Art

Solid propellant rocket motors are known in the prior art in which the casing for the propellant is fabricated from strong filaments in a matrix of a curable polymer. A casing made in this way is known in the trade as a composite or filament-wound casing. Because of the nature of the composite material, water vapor from the atmosphere, over a long period of time, can permeate the casing. Permeation of the casing with water vapor causes the propellant bond to the case and/or intermediate liner between the case and propellant to fail. Such failure results in an unusable rocket motor. If used, the rocket motor can fail catastrophically.

A metal foil is the most effective known barrier against such water vapor or moisture permeation. The application of a metal coating of sufficient thickness (about 0.003 inches or 0.008 centimeters, minimum) to a rocket motor composite casing is difficult, however, and presents a number of problems. First, for reasons of safety, ion-vapor deposition of a metal to the composite casing followed by a plating process cannot be effected after the rocket motor casing has been loaded with propellant. Nor can such metallic coating processes be performed on the motor casing before loading of the propellant. This is because of degradation of the casing that could result from the processing after the casing has been certified after pressure testing. The coating cannot be applied before certification with pressure testing because the pressure testing would result in expansion of the casing sufficiently to tear and debond the metallic coating, thus rendering it useless as a barrier against moisture permeation.

A preformed metallic coating adhesively applied to the surface of a rocket motor composite casing after loading could provide an effective barrier to water vapor permeation through the casing. Attempts to use such preformed coatings, however, have also been beset with problems, particularly in respect of the application of such preformed coatings to the ends of the casing which normally comprise a hemispherical dome of generally spherical shape.

For the cylindrical surfaces of the casing, or other surface areas of regular shape, a preformed metal coating can consist of a metal foil adhesively-backed tape such as aluminum tape. The cylindrical and regular surfaces can be covered with the tape spirally wrapped around the case and overlapped sufficiently to effectively prevent the passage of water vapor.

The hemispherical domes on the ends of the casing, however, cannot be covered with foil tape. This is because the foil tape cannot be applied without wrinkles. Wrinkles can cause cracks in the tape that allow moisture vapor passage thus rendering the foil tape useless as a barrier against water vapor permeation.

Another factor requiring consideration in the use of a metallic moisture barrier is low weight. Any weight not absolutely required to cause the rocket motor to operate properly diminishes the efficiency thereof.

It has been proposed in the prior art to fabricate free standing metal shells for adhesive bonding to the dome ends of a composite cased solid propellant rocket motor. Such preformed shells are of complex shape and must have sufficient thickness to prevent the passage of moisture. They must also be of the lightest practical weight which is structurally strong enough to allow handling and adhesive bonding to the rocket motor case. Attempts made in the prior art to fabricate such dome covers or shells have not been successful. One technique that has been tried is spin forming. Spin forming is widely used to form complex metallic shapes and would be satisfactory except that the thickness of metal required to use this technique is approximately 0.060 inches, minimum. This is about ten times the thickness, and consequently, the weight that is desired for metallic shells to cover the dome ends of a composite cased solid propellant rocket motor.

Thus, there is a need and a demand for an improved method and apparatus that overcome the aforementioned difficulties that have been encountered in the prior art for preserving composite material cased solid propellant rocket motors against the deleterious effects of water vapor in the atmosphere. The present invention was devised to fill the technological gap that has existed in the art in this respect.

SUMMARY OF THE INVENTION

An object of the invention is to provide a method of and apparatus for preserving a composite material cased solid propellant rocket motor against harmful effects that can be caused by permeation through the case of water vapor from the atmosphere.

Another object of the invention is to provide a method for forming metallic shells of complex shape and of sufficient thickness to prevent the passage therethrough of water vapor but of the lightest practical weight which is structurally strong enough to allow handling and adhesive bonding of the shells to the dome ends of a composite cased solid propellant rocket motor.

A further object of the invention is to provide a metallic shell of complex shape and of sufficient thickness to prevent the passage of water vapor but of the lightest practical weight which is structurally strong enough to allow handling and adhesive bonding to a dome end of a composite cased solid propellant rocket motor, which metallic shell has been fabricated by a process including the steps of:

(a) forming a mold the shape of the outer surface of which duplicates the shape of one of the ends of the composite cased solid propellant rocket motor to be fitted with said metallic shell, said mold being made of a material that can be coated by a vapor-ionization metal deposition process and that can withstand a metal plating bath;

(b) applying a coating of metal by vapor-ionization deposition to the said outer surface of said mold to form a thin coating of less than one-half mil thick;

(c) plating a further coating of metal to said ion-vapor coating on said mold to build up a combined metal coating thickness thereon in the range of about one to eight mils; and (d) separating the combined metal coating on the mold from the mold thereby to form a free-standing metallic shell.

In accomplishing these and other objectives of the invention, there is provided a form or mold duplicating the form of the dome of the rocket motor casing to be fitted with a metal shell or barrier for preventing permeation of water vapor therethrough. The form of mold may be made from any material that can be later separated either mechanically or chemically from the completed metal shell. Another property of the form or mold that is required is that it must be of a material that can be coated by a vapor-ionization metal deposition process. Examples of materials that are suitable for the form or mold are sand-polyvinyl alcohol mixtures which are water soluble, foam plastics such as expanded bead polystyrene which is solvent soluble, or papier mache which is water destructible.

The form or mold must be of a material that can withstand a metal plating bath. Included among such materials are expanded bead polystyrene and sand-polyvinyl alcohol mixtures.

After applying a coating of metal, preferably aluminum, by ion-vapor deposition to the mold to make an electrically conductive surface having a thickness of less that half a mil (0.0005 inches or 0.0013 centimeters), the ion-vapor coated mold is further coated by a process such as electroplating with aluminum or other metal to build up a desired combined five to eight mil (0.005 to 0.008 inches or 0.013 to 0.020 centimeters) thick metal coating.

After building up the desired combined metal coating on the mold, the mold and metal coating are separated. If expanded bead polystyrene is used for making the mold, it can be removed from the metal shell by dissolving it with a suitable solvent. Methyl Ethyl Ketone is very effective in dissolving expanded bead polystyrene.

With careful handling, metal shells or domes so formed can be adhesively bonded to each of the ends of the rocket motor case by a suitable adhesive, an example of which is epoxy.

For the cylindrical surfaces of the rocket motor casing, the metal coating, as previously mentioned, may consist of a metal foil adhesively-backed tape, for example, aluminum foil tape spirally wrapped around the case and overlapped sufficiently to prevent the passage therethrough of water vapor.

The various features of novelty which characterize the present invention are pointed out with particularity in the claims annexed to and forming a part of this specification. For a better understanding of the invention, its operating advantages, and specific objects attained by its use, reference is made to the accompanying drawings and descriptive matter in which a preferred embodiment of the invention is illustrated.

BRIEF DESCRIPTION OF THE DRAWINGS

With this description of the invention, a detailed description follows with references being made to the accompanying figures of drawing which form part of the specification and of which:

FIG. 1 is a perspective diagrammatic elevation, partly in section, of a rocket motor in which the invention is incorporated;

FIG. 2 is a cross section taken along the lines 2—2 of FIG. 1 showing the rocket motor propellant, the composite case formed on the propellant, and the wrapping of aluminum tape on the composite case;

FIGS. 3 and 4 are elevation and side views, respectively, of a hemispherically shaped mold;

FIGS. 5 and 6 are views similar to FIGS. 3 and 4, respectively, showing a thin coating of metal deposited by an ion-vapor process on the hemispherical surface of the mold;

FIGS. 7 and 8 are views similar to FIGS. 5 and 6, respectively, with a further deposit of metal plated on the ion-vapor deposited coating on the mold, and;

FIG. 9 is a view which is similar to that of FIG. 7 with the combined metal deposit separated from the mold thereby forming a free standing shell or dome.

BRIEF DESCRIPTION OF THE PREFERRED EMBODIMENT

Referring now to the drawings and in particular to FIGS. 1 and 2, there is shown a rocket motor 10 having a forward end 12 and a nozzle 14 of the convergent-divergent type that is installed in the aft end 16 thereof. A solid propellant charge or grain 18 is contained in motor 10 within a casing 20. Casing 20 is fabricated from strong fibers or filaments in a matrix of curable polymer and is of a type known to those skilled in the art as a composite casing. The fibers or filaments may be of organic or inorganic composition. One material that has come widely into use is the aramid polymers that are commercially available from E.I. Du Pont de Nemours and Company, Wilmington, Del., under the trademark KEVLAR ®. The propellant grain 18 may be directly bonded to the interior wall of the casing 20 or bonded to an intermediate liner (not shown) between the casing 20 and the propellant 18. The nature of the composite material of which the casing 20 is formed is such, as previously mentioned, that water vapor from the atmosphere can, over a long period of time, permeate the casing 20, and render the rocket motor 10 useless.

As a protective barrier against such moisture permeation, there is provided for the external cylindrical surface 22 of casing 20 a barrier of lightweight metal consisting of a metal foil 24 adhesively-backed tape such as aluminum foil tape. Such tape having a metal thickness in the range of 0.003 to 0.008 inches is available commercially from 3M Tapes/Adhesive Divisions, 3M-Center, St. Paul, Minn. 55144 under the tradename Scotch Brand No. 425. The cylindrical surfaces of casing 20 can be covered with the aluminum tape 24 spirally wrapped around the case and overlapped sufficiently to prevent the passage of water vapor from the atmosphere through the wall of casing 20 over long periods of time.

At the forward and the aft ends thereof, however, the casing 20, as seen in FIG. 1, has a hemispherical dome of generally spherical shape. The dome at the forward end is designated by the reference numeral 26 and that at the aft end by numeral 28. Domes 26 and 28 cannot effectively be covered with foil tape because of the difficulty, as previously mentioned, in applying the tape without wrinkles. Wrinkles can cause cracks in the tape that allow moisture vapor passage, thus rendering such a tape barrier useless.

For forming a barrier against moisture permeation at the hemispherical forward and aft ends of the rocket Motor 10, there is provided, according to the invention, a method for fabricating a lightweight shell or dome that can be adhesively bonded onto the dome ends 26 and 28 of the composite casing 20.

Thus, there is provided a form or mold 30, as shown in FIGS. 3 and 4, that duplicates the form of the end 26 or 28 of the rocket motor 10 to be fitted with a metal shell or dome. The mold 30 can be made of any material that can later be separated either mechanically or chemically from the completed metal shell. Additionally, the mold 30 must be made of a material that can be coated by a vapor-ionization metal deposition process. Examples of materials that are suitable for forms or molds are sand-polyvinyl alcohol mixtures which are water soluble, foam plastics such as expanded bead polystyrene which is solvent soluble or even papier mache, which is water destructible.

Another required property of the mold 30 is that it must be made of a material that can withstand processing in a metal plating bath. Such a material is expanded bead polystyrene. Sand-polyvinyl alcohol is also an example of such a material.

A coating of metal (preferably aluminum) indicated by reference numeral 32 in FIGS. 5 and 6 is applied by an ion-vapor deposition process to the mold 30. Since the ion-vapor deposition process is known in the prior art and per se forms no part of the present invention, it will not further be described herein. The thickness of the coating 32 on the hemispherical surface of the mold 30 is about a half a mil. The thickness of the coating 32 shown in FIG. 6 necessarily is exaggerated. While very thin, it is sufficient to provide a continuous electrically conductive coated surface thereon.

In accordance with the invention, the ion-vapor coated hemispherical surface of the mold 30 is further coated with aluminum or other suitable metal by an electroplating or electroless plating process to build up the thickness to a combined five to eight mils thick metal coating 34, as illustrated, again in exaggerated manner, in FIG. 8.

After building up the desired metal coating 34 on the mold 30, the coating 34 is separated from the mold 30. When expanded bead polystyrene is used in making the mold 30, it can be removed from the metal coating or shell 34 by dissolving it with a solvent. Methyl Ethyl Ketone is very effective in dissolving the expanded bead polystyrene and thus effecting the desired separation of the metal shell 34 therefrom.

With careful handling, the metal shell 34 is adhesively bonded to the loaded rocket motor composite casing 20 with a suitable adhesive, for example, an epoxy. Thus, as shown in FIG. 1, the metal shell 34 is shown bonded to the forward end 26 of the rocket motor 10. Where the hemispherical surface at the aft end 28 of the motor casing 20 is substantially identical to that at the forward end 26, a similar metal shell, designated 34a, may be adhesively bonded to the aft end 28. Metal shell 34a may be identical to shell 34 except for having an opening 34b cut out therein to provide an opening for accommodating the rocket motor nozzle 14. Desirably, as indicated, the region adjacent to the cutout of the metal shell 34 may be adhesively bonded to an outer peripheral portion of the nozzle 14 thereby to provide a barrier against water vapor permeation through casing 20 at that region.

Thus, in accordance with the invention, there is provided a method of and apparatus for protecting a composite cased solid propellant rocket motor from degradation resulting from moisture permeation by installing a unique thin lightweight metal shell on the dome ends of the case, the cylindrical or regular shaped portion of the case being covered with metal foil consisting of commercially available adhesively backed tape such as aluminum foil tape. There being no means known in the prior art for fabricating the desired lightweight metal shell, the invention is seen to be concerned with a method for forming such a shell by the use of a plating process which may comprise an electroplating or an electroless plating process. Upon building up of the coating to a desired thickness, the mold and the metallic shell are separated. The resulting metallic shell, which has a thickness in the range of five to eight mils, is adhesively bonded to one of the dome ends of the loaded rocket motor casing, with a similar metallic shell being adhesively bonded to the other dome end of the casing.

With this description of the invention in detail, those skilled in the art will appreciate that modifications may be made to the invention without departing from the spirit thereof. Therefore, it is not intended that the scope of the invention be limited to the specific embodiments illustrated and described. Rather, it is intended that the scope of the invention be determined by the scope of the appended claims.

What is claimed is:

1. A method of preserving a solid propellant rocket motor from degradation resulting from water vapor in the atmosphere, said rocket motor having a case made of composite material and formed with a dome at each of the forward and aft ends with a generally cylindrically shaped surface between said domes, said composite material case being characterized in that, over a long period of time, water vapor from the atmosphere can permeate therethrough to cause the propellant bond to the case and/or an intermediate liner between the case propellant to fail resulting in an unusable rocket motor, comprising the steps of:
   (a) forming a mold having a surface duplicating the shape of a dome of said case of said rocket motor, said mold being made of a material that can later be separated from a metal shell formed on said mold, that can be coated by a vapor-ionization metal deposition process, and that can withstand a metal plating bath;
   (b) applying a coating of metal by ion-vapor deposition to the said surface of said mold, said coating being less than half a mil thick;
   applying a further metal coating to the ion-vapor deposited coating on said mold to build up the combined coating thereon to a thickness in the range of five to eight mils;
   (d) separating the metal coating on the mold from the mold to form a free-standing metal shell;
   adhesively bonding a metal shell as formed by steps (a) through (d) to the dome at each of the forward and aft ends of said case to form a barrier thereat against water vapor penetration; and
   (f) spiral wrapping a metal foil adhesively-backed tape to the cylindrically shaped surface of said case overlapped sufficiently to prevent the passage of water vapor therethrough.

2. A method as defined by claim 1 wherein said mold is made of expanded bead polystyrene.

3. A method as defined by claim 2 wherein the combined metal coating formed on said expanded bead polystyrene mold is separated from the mold by dissolving the mold with a solvent.

4. A method as defined by claim 1 wherein said mold is made of a sand-polyvinyl alcohol mixture.

5. A method as defined by claim 4 wherein the combined metal coating formed said sand-polyvinyl alcohol mixture mold is separated from the mold by dissolving the mold with a solvent.

6. A method as defined by claim 1 wherein the metal coating deposited on said mold by ion-vapor deposition is aluminum.

7. A method as defined by claim 6 wherein the further metal coating applied to the ion-vapor deposited coating is aluminum.

8. A method as defined by claim 7 wherein said further metal coating is applied to the ion-vapor deposited coating by a electroplating process.

9. A method as defined by claim 8 wherein said mold is made of expanded bead polystrene, and wherein the combined metal coating formed on said expanded bead polystyrene mold is separated therefrom by dissolving the expanded bead polystyrene mold with Metyl Ethyl Ketone.

10. A method as defined in claim 8 wherein said mold is made of a sand-polyvinyl alcohol mixture, and wherein the combined metal coating formed on said sand-polyvinyl alcohol mixture mold is separated therefrom by dissolving the sand-polyvinyl alcohol mixture mold with water.

* * * * *